US012664163B1

(12) United States Patent
Utkarsh et al.

(10) Patent No.: US 12,664,163 B1
(45) Date of Patent: *Jun. 23, 2026

(54) ADDING A COLUMN INTO A WORKSHEET

(71) Applicant: SIGMA COMPUTING, INC., San Francisco, CA (US)

(72) Inventors: Deepanshu Utkarsh, San Francisco, CA (US); Alexis Johnson, Minneapolis, MN (US); Joseph M. Hain, Benicia, CA (US); Kenneth Truong, Temple City, CA (US); Nipurn Doshi, Pleasanton, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/440,356

(22) Filed: Feb. 13, 2024

Related U.S. Application Data

(63) Continuation of application No. 17/983,486, filed on Nov. 9, 2022, now Pat. No. 11,966,392.

(60) Provisional application No. 63/278,087, filed on Nov. 10, 2021.

(51) Int. Cl.
*G06F 16/20* (2019.01)
*G06F 16/2453* (2019.01)
*G06F 16/2455* (2019.01)
*G06F 40/18* (2020.01)

(52) U.S. Cl.
CPC .... *G06F 16/24537* (2019.01); *G06F 16/2456* (2019.01); *G06F 40/18* (2020.01)

(58) Field of Classification Search
None
See application file for complete search history.

(56) References Cited

U.S. PATENT DOCUMENTS

| | | | | |
|---|---|---|---|---|
| 5,371,675 A | * | 12/1994 | Greif | G06F 40/18 |
| | | | | 715/781 |
| 7,251,776 B2 | * | 7/2007 | Handsaker | G06F 40/18 |
| | | | | 715/213 |
| 11,281,672 B2 | | 3/2022 | Seiden et al. | |
| 11,308,269 B1 | * | 4/2022 | Rodgers | G06F 40/18 |
| 2008/0016041 A1 | * | 1/2008 | Frost | G06F 16/258 |
| 2008/0140696 A1 | * | 6/2008 | Mathuria | G06F 16/221 |
| | | | | 707/999.102 |
| 2015/0026153 A1 | * | 1/2015 | Gupta | G06F 16/24522 |
| | | | | 707/711 |
| 2017/0371881 A1 | * | 12/2017 | Reynolds | G06F 16/248 |

(Continued)

*Primary Examiner* — Belix M Ortiz Ditren

(57) ABSTRACT

Adding a column into a worksheet, including: receiving, via a spreadsheet interface comprising a first worksheet, a request to add a new column to the first worksheet, wherein the request includes a key that identifies a reference column in the first worksheet, a specification of a second worksheet that comprises a corresponding reference column related by the key, and a specification of a data column in the second worksheet, wherein each entry of the data column is associated with an entry of the corresponding reference column in the second worksheet, and entries to be included in the requested new column will be based on the entries of the data column; generating, based on the request, a database query; and receiving, from a database and in response to the database query, a query result comprising the new column to be added to the first worksheet.

20 Claims, 6 Drawing Sheets

(56) References Cited

U.S. PATENT DOCUMENTS

2020/0125559 A1*  4/2020  Talbot ................. G06F 3/04842
2020/0150938 A1   5/2020  Stachura
2021/0397420 A1* 12/2021  Stachura ............... G06F 40/186
2022/0067271 A1   3/2022  Logan et al.

* cited by examiner

ADDING A COLUMN INTO A WORKSHEET

BACKGROUND

Field of the Disclosure

The field of the disclosure is data processing, or, more specifically, methods, apparatus, and products for adding a column into a worksheet.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for adding a column into a worksheet including receiving, via a spreadsheet interface comprising a first worksheet, a request to add a new column to the first worksheet, where the request includes a key that identifies a reference column in the first worksheet, a specification of a second worksheet that comprises a corresponding reference column related by the key, and a specification of a data column in the second worksheet, where each entry of the data column is associated with an entry of the corresponding reference column in the second worksheet, and entries to be included in the requested new column will be based on the entries of the data column; generating, based on the request, a database query; and receiving, from a database and in response to the database query, a query result comprising the new column to be added to the first worksheet.

The foregoing and other objects, features and advantages of the disclosure will be apparent from the following more particular descriptions of exemplary embodiments of the disclosure as illustrated in the accompanying drawings wherein like reference numbers generally represent like parts of exemplary embodiments of the disclosure.

DETAILED DESCRIPTION

Figure 1:
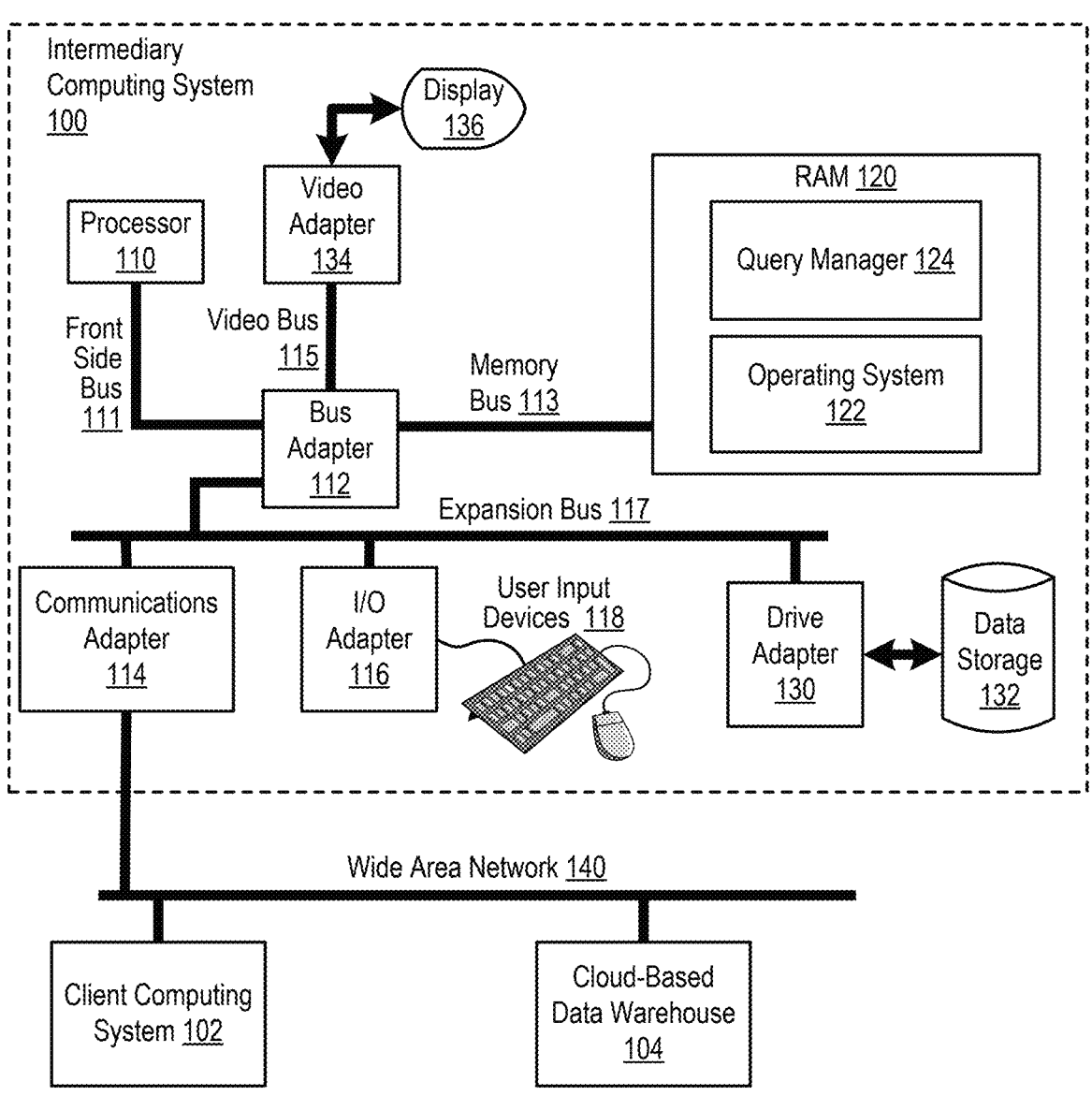
FIG. 1 shows a block diagram of an example system configured for adding a column into a worksheet according to embodiments of the present disclosure.

Exemplary methods, apparatus, and products for adding a column into a worksheet in accordance with the present disclosure are described with reference to the accompanying drawings, beginning with FIG. 1. FIG. 1 sets forth a block diagram of automated computing machinery comprising an exemplary intermediary computing system 100 configured for adding a column into a worksheet according to embodiments of the present disclosure. The intermediary computing system 100 of FIG. 1 includes at least one computer processor 110 or 'CPU' as well as random access memory ('RAM') 120 which is connected through a high speed memory bus 113 and bus adapter 112 to processor 110 and to other components of the intermediary computing system 100.

Stored in RAM 120 is an operating system 122. Operating systems useful in computers configured for preamble according to embodiments of the present disclosure include UNIX™, Linux™, Microsoft Windows™, AIX™, and others as will occur to those of skill in the art. The operating system 122 in the example of FIG. 1 is shown in RAM 120, but many components of such software typically are stored in non-volatile memory also, such as, for example, on data storage 132, such as a disk drive. Also stored in RAM is the query manager 124, a module for a worksheet according to embodiments of the present disclosure.

The intermediary computing system 100 of FIG. 1 includes disk drive adapter 130 coupled through expansion bus 117 and bus adapter 112 to processor 110 and other components of the intermediary computing system 100. Disk drive adapter 130 connects non-volatile data storage to the intermediary computing system 100 in the form of data storage 132. Disk drive adapters useful in computers configured for adding a column into a worksheet according to embodiments of the present disclosure include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 100 of FIG. 1 includes one or more input/output ('I/O') adapters 116. I/O adapters implement user-oriented input/output through, for example, software drivers and computer hardware for controlling output to display devices such as computer display screens, as well as user input from user input devices 118 such as keyboards and mice. The example intermediary computing system 100 of FIG. 1 includes a video adapter 134, which is an example of an I/O adapter specially designed for graphic output to a display device 136 such as a display screen or computer monitor. Video adapter 134 is connected to processor 110 through a high speed video bus 115, bus adapter 112, and the front side bus 111, which is also a high speed bus.

The exemplary intermediary computing system 100 of FIG. 1 includes a communications adapter 114 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for adding a column into a worksheet according to embodiments of the present disclosure include modems for wired dial-up communications, Ethernet (IEEE 802.3) adapters for wired data communications, and 802.11 adapters for wireless data communications.

The communications adapter 114 of FIG. 1 is communicatively coupled to a wide area network 140 that also includes a client computing system 102 and a cloud-based data warehouse 104. The cloud-based data warehouse 104 is a computing system or group of computing systems that hosts a database or databases for access over the wide area network 140. The client computing system 102 is a computing system that accesses the database using the query manager 124.

Figure 2:
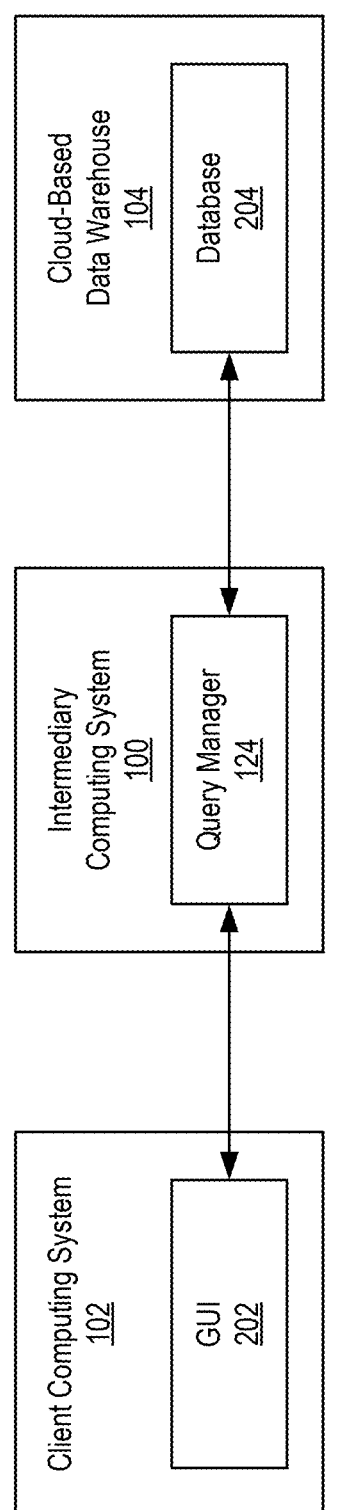
FIG. 2 shows a block diagram of an example system configured for adding a column into a worksheet according to embodiments of the present disclosure.

FIG. 2 shows a block diagram of an exemplary system for adding a column into a worksheet according to embodiments of the present disclosure. As shown in FIG. 2, the system includes a client computing system 102, an intermediary computing system 100, and a cloud-based data warehouse 104. The client computing system 102 includes a graphical user interface ('GUI') 202. The intermediary computing system 100 includes a query manager 124. The cloud-based data warehouse 104 includes a database 204. The client computing system 102 may access the cloud-based data warehouse 104 and database 204 via the query manager 124 on the intermediary computing system 100.

The GUI 202 of FIG. 2 is a visual presentation configured to present data sets in the form of worksheets, and graphical elements to a user. The GUI 202 also receives requests from a user for data sets from the database 204. The GUI 202 may also present to the user the ability to add a new column into a worksheet and specify which data to include in the newly added column. The GUI 202 may be presented, in part, by the query manager 124 and displayed on a client computing system 102 (e.g., on a system display or mobile touchscreen). The GUI 202 may be part of an Internet application that includes the query manager 124 and is hosted on the intermediary computing system 100.

The database 204 of FIG. 2 is a collection of data and a management system for the data. A data set is a collection of data (such as a table) from the database 204. Data sets may be organized into columns and rows (also referred to as records). The particular columns, rows, and organization of the columns and rows that make up a data set or table may be specified in the database query requesting the data set. Data sets may be sent from the cloud-based data warehouse 104 in response to a database query (also referred to as a database statement). Accordingly, data sets retrieved in response to a database query may be referred to as query results.

The query manager 124 of FIG. 2 is hardware, software, or an aggregation of hardware and software configured to receive instructions in the form of state specifications from the client computing system 102, via the GUI 202. The query manager 124 is also configured to generate database queries in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 102. Such manipulations and data may indicate requests for and manipulations of worksheets presenting data sets. Such manipulations and data may also indicate requests to add a new column to an existing worksheet, where the requests specify which data to include in the newly added column. The state specification may be a standard file format used to exchange data in asynchronous browser-server communication. For example, the state specification may be a JavaScript Object Notation specification. The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The query manager 124 uses the state specification as input to generate a database query. This database query generation process may begin with the state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database query.

The query manager 124 may use the database query to fetch query results (i.e., a data set) from the database 204. The query manager 124 may then present the query results to a user via the GUI 202. The query manager 124 may further manage worksheets within the GUI to which a user has made edits, such as adding new columns. Further, the query manager 124 may add rows to new columns or create new worksheets.

Figure 3:
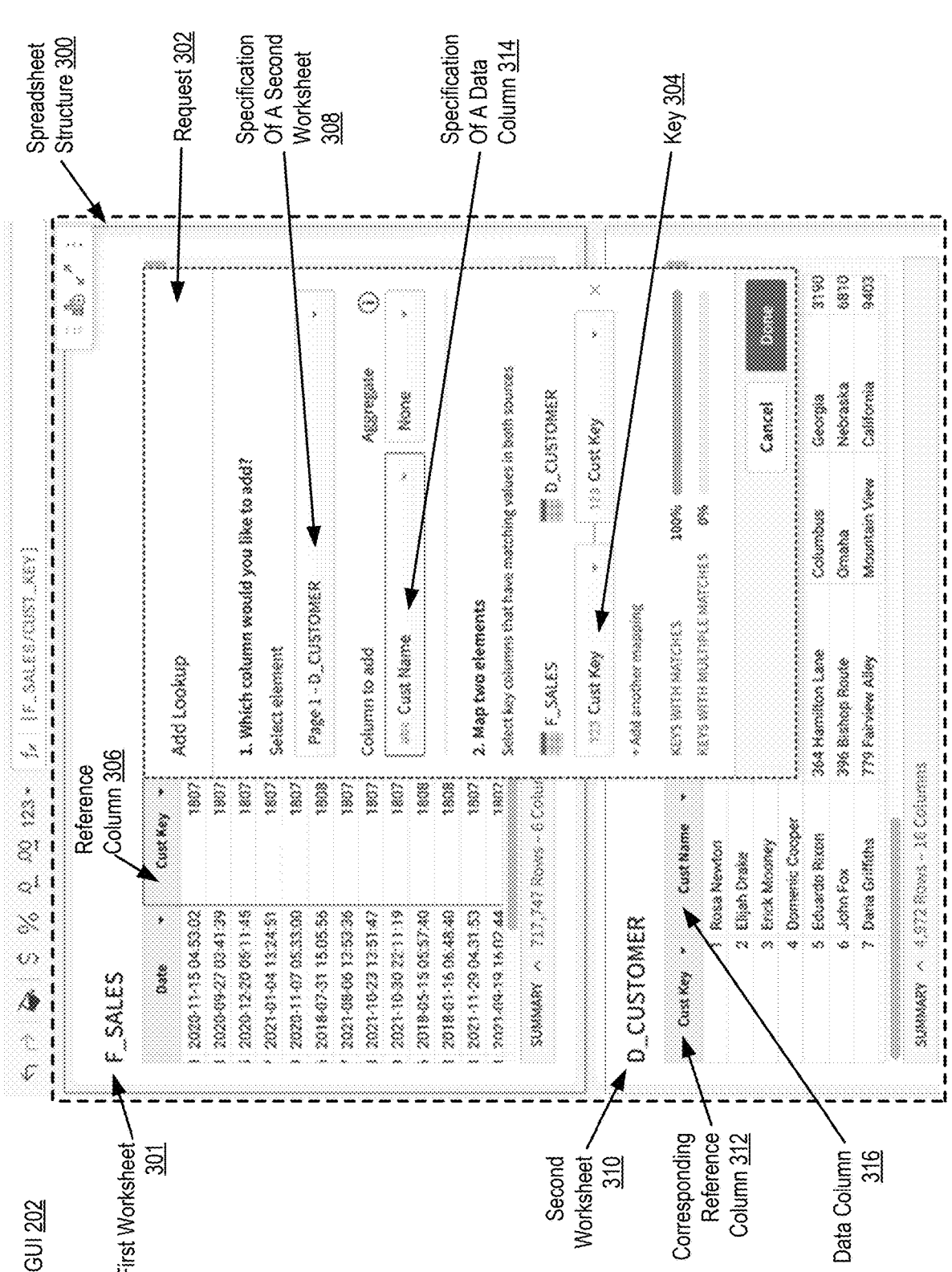
FIG. 3 shows a block diagram of an example user interface configured for adding a column into a worksheet according to embodiments of the present disclosure.

FIG. 3 shows an exemplary GUI for adding a column into a worksheet according to embodiments of the present disclosure. As shown in FIG. 3, the exemplary GUI 202 includes a spreadsheet structure 300 including multiple worksheets. The example spreadsheet structure 300 of FIG. 3 shows two worksheets (worksheet F_SALES and worksheet D_CUSTOMER). Each of the worksheets shown within the spreadsheet structure 300 of FIG. 3 may be a separate worksheet, where each worksheet is a presentation of a particular data set within a database. In one example, each of the worksheets shown within the spreadsheet structure 300 of FIG. 3 may be a presentation of a different data set within the database 204 of the cloud-based data warehouse 104 of FIG. 2. In one embodiment, a user may create a request 302 via the GUI 202 while the GUI shows only a single worksheet, such as the first worksheet 301.

The spreadsheet structure 300 is a graphical element and organizing mechanism for a worksheet that presents a data set. A worksheet is a presentation of a data set (such as a table) from a database on a data warehouse. The spreadsheet structure 300 displays the data set as rows of data organized by columns. The columns delineate different categories of the data in each row of the worksheet. The columns may also be calculation columns that include calculation results using other columns in the worksheet or from within a separate worksheet.

The GUI 202 may also include a mechanism for a user to request a data set from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the query manager 124. Such a mechanism may also include a direct identification of the rows and columns of a database worksheet that a user would like to access (e.g., via a selection of the rows and columns in a dialog box).

The GUI 202 may also include a mechanism for a user to add a column to a worksheet that includes data based on a different data set or table within the database 204. Such a mechanism may be part of the interactivity of the worksheet. Specifically, a user may manipulate a worksheet (e.g., by typing a formula, right clicking on a column to display a drop down menu, inputting information into a drop down menu, etc.) and, in response, the GUI 202 may generate a request (e.g., in the form of a state specification) for a specified portion of data from a data set or table within the database and send the request to the query manager 124. Such a mechanism may also include a direct identification of the data set or table (or a worksheet presenting such data set) that contains data which a user would like to include in the new column (e.g., via a selection of the worksheet, and the particular column, in a dialog box). For example, a user of the GUI 202 that includes a first worksheet 301 (namely, "F_SALES") may generate a request 302 to add a new column to the first worksheet 301 using a drop down menu, as shown in FIG. 3. The request 302 may also include a mechanism for a user to include a key 304 that identifies a particular reference column within the first worksheet to reference when inserting the new column into the first worksheet. In the example of FIG. 3, the user includes the key 304 within the request 302 to identify the reference column 306 (namely, "Cust Key") as a column within the first worksheet to be referenced when requesting data to include in the new column to be added to the F_SALES worksheet.

Continuing with the above example, the request 302 may also include a mechanism for a user to include a specification 308 of a second worksheet, where the user may specify which other data set within the database 204 (or worksheet presenting that data set) to request data from when inserting the new column into the first worksheet. In the example of FIG. 3, the user identifies the second worksheet 310 (namely, "D_CUSTOMER") as the data set or worksheet to request data from when adding the new column to the F_SALES worksheet. The data set identified by the specification 308 may be a data set different from the data set presented within the first worksheet. The data set identified in the request 302 by the specification 308 may be identified using a named worksheet presenting that data set (such as the second worksheet 310) or the data set may be identified directly from the database, independent of whether the data set is presented by any worksheet. The GUI 202 may require the user generating a request 302 to identify, via the specification 308, a data set or worksheet that includes a column related to the key 304 (namely, the corresponding reference column 312). In the example shown in FIG. 3, the key 304 specified in the request 302 is related to a reference column 306 (namely, "Cust Key") in the first worksheet F_SALES, and to a corresponding reference column 312 (namely, "Cust Key") in the second worksheet D_CUSTOMER. Specifically, both the F_SALES and D_COSTOMER worksheets include a column (namely, "Cust Key") related to the key 304 specified in the request.

Continuing with the above example, the request 302 may also include a mechanism for a user to include a specification 314 of a data column, where the user may specify within the GUI which column of the second worksheet to request data from when inserting the new column into the first worksheet. In the example of FIG. 3, the user identifies the data column 316 (namely, "Cust Name") as the column to request data from when adding the new column to the F_SALES worksheet. Each entry of the data column 316 identified by the specification 314 may be associated with an entry of the corresponding reference column 312 in the second worksheet 310. The entries to be included within the requested new column may be based on, or match, the entries of the data column 316 specified in the request 302.

Continuing with the above example, the GUI 202 of FIG. 3, in response to generating the request, may send the request 302 (e.g., in the form of a state specification) to the intermediary computing system 100, where the query manager 124 of the intermediary computing system 100 may generate a database query based on the request and send the database query to the cloud-based data warehouse 104. The query manager 124 may receive, from the cloud-based data warehouse and in response to sending the database query, a query result comprising the data to be included within the requested new column. The GUI 202, upon receiving the query result from the query manager 124, may subsequently add the new column to the first worksheet for presentation to the user.

The request 302 of FIG. 3 may also include a mechanism for a user to include a second key that identifies another particular reference column within the first worksheet to reference when inserting the new column into the first worksheet. In the example of FIG. 3, such a mechanism is depicted as an option under "+Add another mapping" and may be selected by the user to add, in the request 302, an identification of a second key of a second reference column in the first worksheet. In another embodiment, a user may identify any number of additional keys within the request 302.

Figure 4:
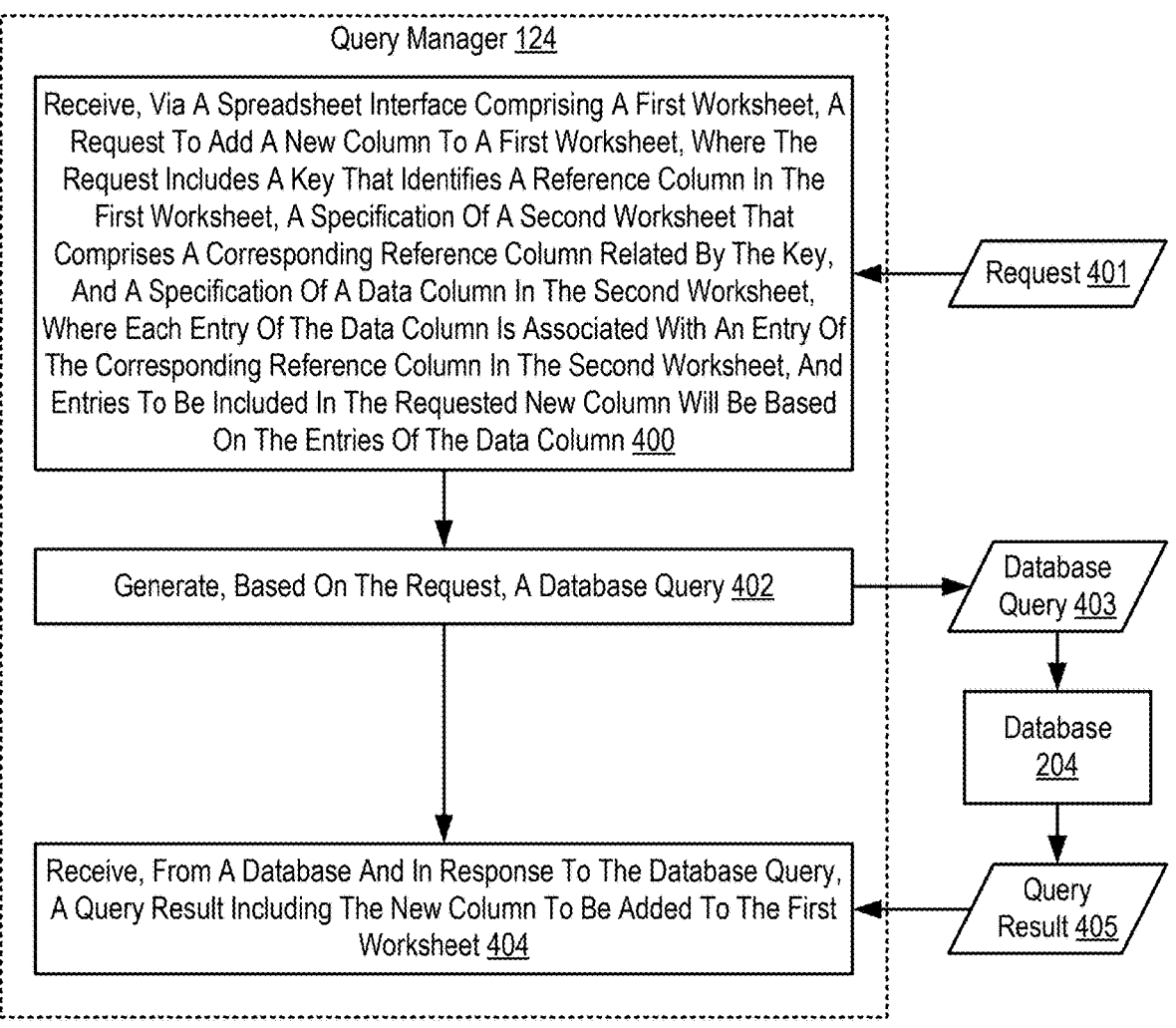
FIG. 4 shows a flowchart of an example method for adding a column into a worksheet according to some embodiments of the present disclosure.

For further explanation, FIG. 4 sets forth a flow chart illustrating an exemplary method for adding a column into a worksheet according to embodiments of the present disclosure. The method of FIG. 4 includes receiving 400, via a spreadsheet interface comprising a first worksheet, a request 401 to add a new column to the first worksheet. The request 401 may be received 400 in the form of a state specification from the GUI 202. Specifically, each change to the GUI may result in a new or updated state specification that operates as an instruction to the query manager 124. Receiving 400 the request 401 may be carried out by detecting, by the GUI 202, that a user has manipulated elements of the GUI and/or submitted data using the GUI such that the generation of the request 401 is triggered, and the request 401 is sent to query manager 124 of the intermediary computing system 100 over the wide area network 140 and from the client computing system 102. The initial presentation of the worksheet may be in response to a worksheet request made through the GUI. For example, a user may select the worksheet from a group of worksheets presented for display on the GUI. In one embodiment, the request to add a column may be received without presenting the second worksheet within the GUI.

In the method of FIG. 4, the request 401 may include a key that identifies a reference column in the first worksheet. The request 401 may also include a specification of a second worksheet that comprises a corresponding reference column related by the key. The request 401 may also include a specification of a data column in the second worksheet that includes data to be requested when adding the new column to the first worksheet. In the method of FIG. 4, each entry of the data column in the second worksheet is associated with an entry of the corresponding reference column that is also in the second worksheet. In the method of FIG. 4, entries to be included in the requested new column may be based on, or match, the entries of the data column in the second worksheet.

The method of FIG. 4 also includes generating 402, based on the received request 401, a database query 403. Generating 402 a database query based on the received request may be carried out by the query manager 124 of the intermediary computing system 100 generating a database query 403 based on the key included in the request, the specification of a second worksheet included in the request, and the specification of a data column included in the request. The database query 403 generated by the query manager may be written in a structured query language (SQL) and may be intended for a database 204 of the cloud-based data warehouse 104.

The method of FIG. 4 also includes receiving 404 a query result 405 from the database 204. Receiving 404 the query result 405 from the database 204 may be carried out in response to the database query 403 being sent to the database and the database returning the query result to the query manager 124 over the wide area network 140. In the method of FIG. 4, the database query 403 may include the requested new column to be added to the first worksheet. The query manager 124 may, in response to receiving the query result comprising the requested data set, add the new column to the first worksheet for presentation to a user via the GUI 202. The new column may be added to the first worksheet at a location specified by the request 401 generated via the GUI 202. For example, the request for adding the new column may include a pointer identifying where within the first worksheet the requested new column is to be added.

Figure 5:
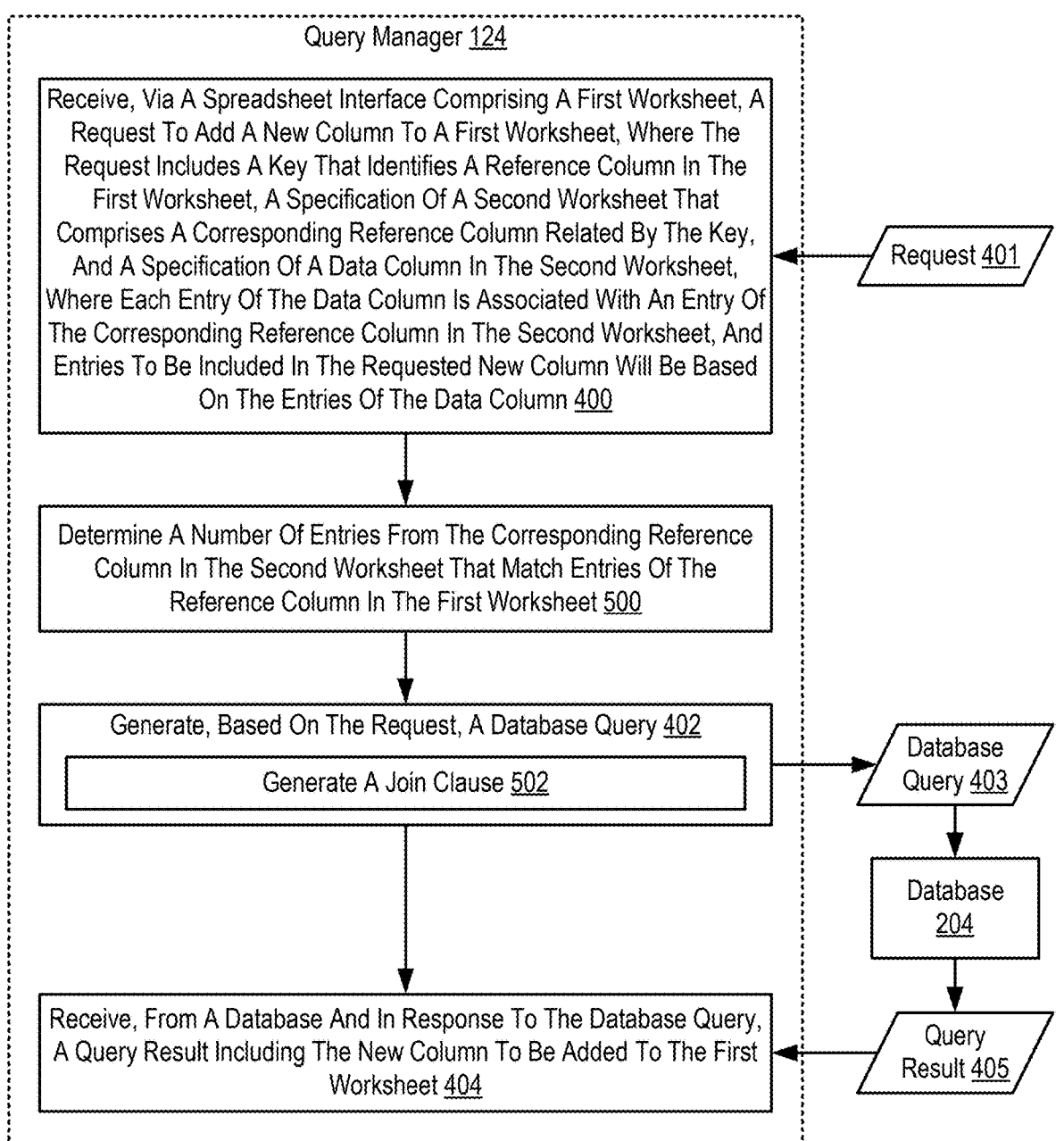
FIG. 5 shows a flowchart of an example method for adding a column into a worksheet according to some embodiments of the present disclosure.

For further explanation, FIG. 5 sets forth a flowchart illustrating an exemplary method for adding a column into a worksheet according to embodiments of the present disclosure. The method of FIG. 5 continues with the method of FIG. 4 by further including determining 500 a number of entries from the reference column 306 in the first worksheet 301 that match entries of the corresponding reference column 312 in the second worksheet 310. Determining 500 a number of entries may be carried out by comparing each of the entries within the reference column in the first worksheet with the entries of the corresponding reference column in the second worksheet and determining the number of matching entries. Determining 500 the number of entries may be carried out by the query manager 124 or by the GUI 202 prior to the query manager receiving the request. In response to such a determination 500, the GUI 202 may present a matching score to the user generating the request, where the presented matching score indicates to the user a number, or percentage, of the entries within the reference column of the first worksheet that match entries of the corresponding reference column of the second worksheet. The matching score may thereby indicate to the user what percentage of the requested new column will include entries related to the reference column identified by the key.

The method of FIG. 5 also includes, as part of generating 402 a database query 403 based on the request 401, generating 502 a join clause included within the database query. Generating 502 a join clause within the database query 403 may be carried out by including a join operation within the database query written in SQL. Such an SQL database query including a join clause may be generated automatically by the query manager of the intermediary computing system 100 based on the received request. A join clause included within the database query 403 may be any of a number of types of SQL join operations, such as inner join, left join, left outer join, right outer join, full outer join, and cross join.

Readers of skill will understand that because the intermediary computing system 100 may automatically generate database join queries, a user of the GUI 202 is not required to understand, or have the ability to manually generate, such complex database queries.

Readers of skill will understand that including a join clause, such as a left join, within the SQL database query may result in a change of the cardinality of the first worksheet when adding the new column. In the example of FIG. 3, which shows the key related reference column as "Cust Key" and the data column as "Cust Name", readers will understand that there is a one to one relationship between a customer key and a customer name. In an example where the key related reference column is "Airport ID" and the data column is "Airlines", there may be a one to many relationship between a given airport and the list of airlines operating out of that airport. In such an example where there is a one to many relationship identified within the request 302, the join clause included within the database query may change the cardinality of the first worksheet by expanding the first worksheet to include additional rows.

In one embodiment, when a user is generating a request, the GUI 202 may determine the cardinality of the relationship identified in the request. Such a determination may be carried out by determining, for a given entry of the reference column 306 related to the key 304, the number of entries within the data column 316 which have corresponding entries in the corresponding reference column 312 that match the given entry of the reference column. In an example where there is only one matching data column entry, such as in the above example where a single customer name corresponds with only a single customer key, the value of that data column entry may be included in the new column for that entry. In an example where there are no matches in the data column corresponding to a given entry in the reference column, a null value may be returned within the new column for that entry. In an example where there are multiple matching entries within the data column for a given reference column entry, and where each of those matching entries includes the same value, the newly added column may include that value for the given entry only once-without expanding the first worksheet to include multiple identical values for a given reference column entry. However, in an example where there are multiple matching entries within the data column for a given reference column entry, and where the matching entries include multiple distinct values, a notification to the user may be presented by the GUI 202 to prevent the user from submitting a request which would result in expanding the first worksheet to include the additional rows of the one to many relationship identified in the request.

Continuing with the above example, the GUI 202 of FIG. 3 may present a multiple matches score to the user generating the request, where the presented multiple matches score may indicate to the user a number, or percentage, of the entries within the reference column 306 of the first worksheet 301 which the request links, via the corresponding reference column, to multiple distinct entries of the data column identified in the request. The multiple matches score may thereby indicate to the user the cardinality relationship between the reference column and the corresponding entries of the data column. For example, a multiple matches score of zero, without the presence of multiple distinct matches, would indicate that the newly added column would maintain a cardinality relationship of one to one. In another example, a multiple matches score that is greater than zero, where there is a presence of multiple distinct matches, would indicate that the newly added column would change the cardinality relationship to one to many. In such an example where the multiple matches score is greater than zero, indicating a change in cardinality to one to many, adding such a requested column to the first worksheet may result in an expansion of the first worksheet to include the additional rows required to present the distinct entries of the data column related to the corresponding reference column entries matching a given entry of the reference column. In such an example, the GUI 202 may present a notification to the user suggesting that a different data column within the second worksheet should be selected in the request or that an aggregate option (see FIG. 6 for more detail) should be added to the request to provide better results within the requested new column, and to maintain a cardinality of one to one. Readers of skill will understand that such a notification may prevent the user from unintentionally expanding the first worksheet with multiple additional rows.

Figure 6:
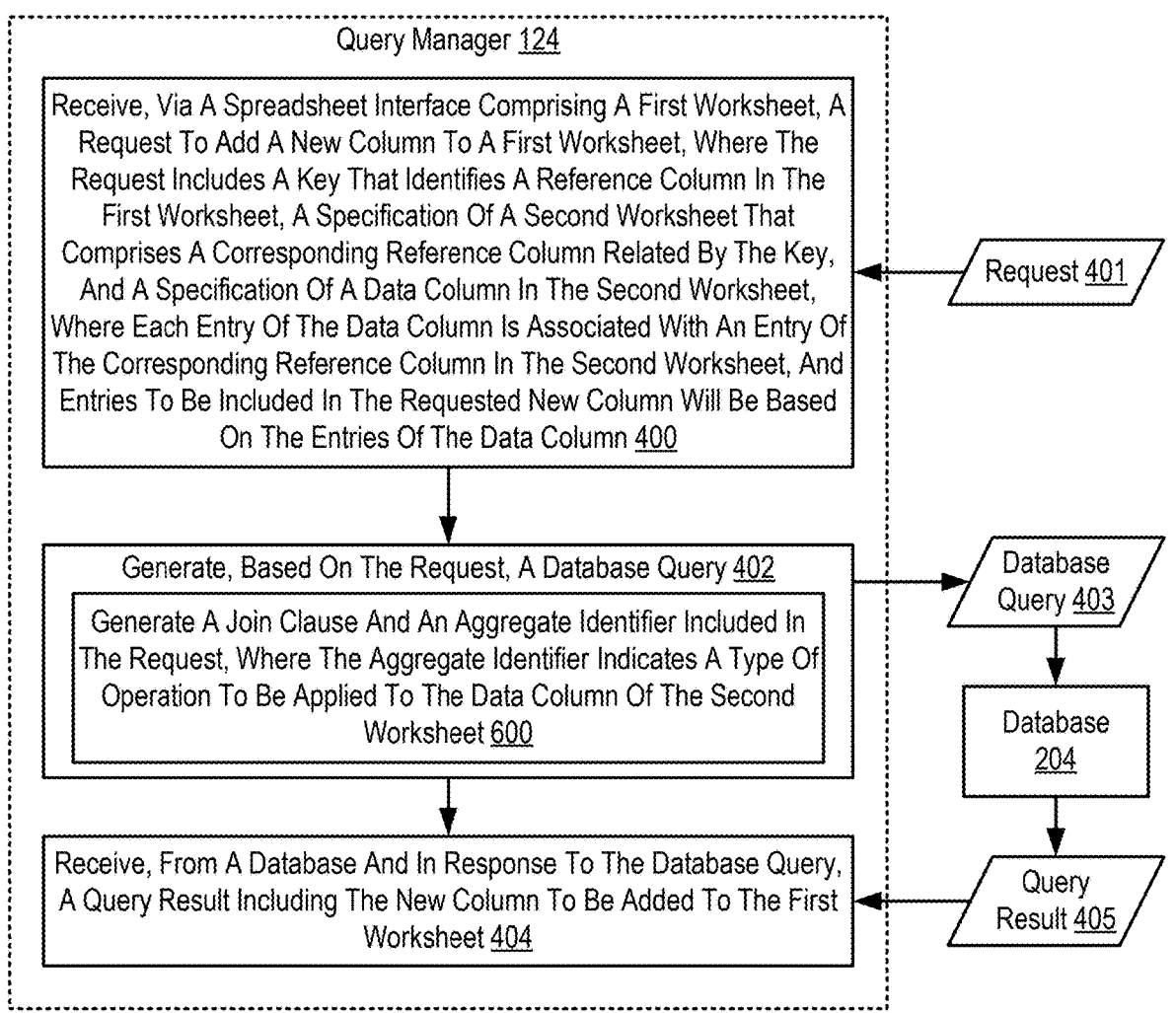
FIG. 6 shows a flowchart of an example method for adding a column into a worksheet according to some embodiments of the present disclosure.

For further explanation, FIG. 6 sets forth a flowchart illustrating an exemplary method for adding a column into a worksheet according to embodiments of the present disclosure. The method of FIG. 6 continues with the method of FIG. 4 by further including, as part of generating 402 a database query 403 based on the request 401, generating 600 a join operation and an aggregate identifier within the database query 403. In the method of FIG. 6, the aggregate identifier generated as part of the database query 403 may be identified within the received request 401 and may indicate a type of operation to be applied to the data column 316 of the second worksheet 310. The aggregate identifier included within the database query 403 may be any of a number of types of operations, such as sum, average, product, median, minimum, maximum, count, count distinct, and the like. Generating 600 a join operation within the database query 403 may be carried out by including a join clause within the database query written in SQL. Such an SQL database query including a join clause may be generated automatically by the query manager 124 of the intermediary computing system 100 based on the received request 401. A join clause included within the database query 403 may be any of a number of types of SQL join operations, such as inner join, left join, left outer join, right outer join, full outer join, and cross join. The database query 403 may include the join clause and the aggregate identifier of an operation to be applied within the join operation. Readers of skill will understand that because the intermediary computing system 100 may automatically generate database join queries with a specified aggregate operation, a user of the GUI 202 is not required to understand, or have the ability to manually generate, such complex database queries.

In view of the explanations set forth above, readers will recognize that the benefits of adding a column into a worksheet according to embodiments of the present disclosure include:

Improving the operation of a computing system by allowing complex database query generation to be offloaded to a query manager, increasing computing system efficiency and usability.

Improving the operation of a computing system by providing a database that receives requests in the form of state specifications from a user-friendly GUI and converting the requests into non-user friendly database queries and other instructions to service the requests, increasing computing system usability and functionality.

Improving the operation of a computing system by generating database queries and presenting worksheets using data sets from a database, increasing computing system usability and functionality.

Exemplary embodiments of the present disclosure are described largely in the context of a fully functional computer system for adding a column into a worksheet. Readers of skill in the art will recognize, however, that the present disclosure also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the disclosure as embodied in a computer program product. Persons skilled in the art will also recognize that, although some of the exemplary embodiments described in this specification are oriented to software installed and executing on computer hardware, nevertheless, alternative embodiments implemented as firmware or as hardware are well within the scope of the present disclosure.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method for adding a column into a worksheet, the method comprising:
   receiving, via a spreadsheet interface comprising a first worksheet, a request to add a new column to the first worksheet using a key that identifies a reference column in the first worksheet and a specification of a second worksheet that comprises a corresponding reference column related by the key;
   generating, based on the request, a database query; and
   receiving, from a database and in response to the database query, a query result comprising the new column to be added to the first worksheet.

2. The method of claim 1, further comprising determining a number of entries from the reference column in the first worksheet that match entries of the corresponding reference column in the second worksheet.

3. The method of claim 1, wherein each entry in the new column matches a corresponding entry within the first worksheet.

4. The method of claim 1, wherein the database query comprises a SQL query.

5. The method of claim 1, wherein the spreadsheet interface is provided on a client computing system, wherein the database is hosted on a cloud-based data warehouse remote from the client computing system, and wherein the receiving of the request, the generating of the database query, and the receiving of the query result are performed by an intermediate computing system distinct from both the client computing system and the cloud-based data warehouse.

6. The method of claim 1, wherein the request further comprises an identification of a second key of a second reference column in the first worksheet.

7. The method of claim 1, wherein generating the database query further comprises generating a join operation and an aggregate identifier included in the request, wherein the aggregate identifier indicates a type of operation to be applied to the second worksheet.

8. The method of claim 7, wherein the type of operation indicated by the aggregate identifier consists of one of: a count operation, a subtracting operation, a sum operation, and an average operation.

9. An apparatus for adding a column into a worksheet, the apparatus comprising a computer processor, a computer memory operatively coupled to the computer processor, the computer memory having disposed within it computer program instructions that, when executed by the computer processor, cause the apparatus to carry out the steps of:

receiving, via a spreadsheet interface comprising a first worksheet, a request to add a new column to the first worksheet using a key that identifies a reference column in the first worksheet and a specification of a second worksheet that comprises a corresponding reference column related by the key;

generating, based on the request, a database query; and receiving, from a database and in response to the database query, a query result comprising the new column to be added to the first worksheet.

10. The apparatus of claim 9, wherein the steps further comprise determining a number of entries from the corresponding reference column in the second worksheet that match entries of the reference column in the first worksheet.

11. The apparatus of claim 9, wherein each entry in the new column matches a corresponding entry within the first worksheet.

12. The apparatus of claim 9, wherein the database query comprises a SQL query.

13. The apparatus of claim 9, wherein generating the database query includes generating a join clause.

14. The apparatus of claim 9, wherein the request further comprises an identification of a second key of a second reference column in the first worksheet.

15. The apparatus of claim 9, wherein generating the database query further comprises generating a join operation and an aggregate identifier included in the request, wherein the aggregate identifier indicates a type of operation to be applied to the second worksheet.

16. The apparatus of claim 15, wherein the type of operation indicated by the aggregate identifier consists of one of: a count operation, a subtracting operation, a sum operation, and an average operation.

17. A computer program product for adding a column into a worksheet, the computer program product comprising a computer readable storage medium, the computer program product comprising computer program instructions that, when executed, cause a computer to carry out the steps of:

receiving, via a spreadsheet interface comprising a first worksheet, a request to add a new column to the first worksheet using a key that identifies a reference column in the first worksheet and a specification of a second worksheet that comprises a corresponding reference column related by the key;

generating, based on the request, a database query; and receiving, from a database and in response to the database query, a query result comprising the new column to be added to the first worksheet.

18. The computer program product of claim 17, wherein the steps further comprise determining a number of entries from the corresponding reference column in the second worksheet that match entries of the reference column in the first worksheet.

19. The computer program product of claim 17, wherein each entry in the new column matches a corresponding entry within the first worksheet.

20. The computer program product of claim 17, wherein the database query comprises a SQL query.

* * * * *